United States Patent
Djurdjevic et al.

(10) Patent No.: US 8,686,094 B2
(45) Date of Patent: Apr. 1, 2014

(54) STORAGE-STABLE TWO-COMPONENT SILICONE ADHESIVES AND SEALANTS WITH EXTENDED MIXER OPEN TIME

(75) Inventors: Alexander Djurdjevic, Zürich (CH); Christin Hamann, Widen (CH); Michael Böttiger, Rudolfstetten (CH)

(73) Assignee: Sika Technology AG, Baar (CH)

( * ) Notice: Subject to any disclaimer, the term of this patent is extended or adjusted under 35 U.S.C. 154(b) by 195 days.

(21) Appl. No.: 13/111,236

(22) Filed: May 19, 2011

(65) Prior Publication Data

US 2012/0022209 A1 Jan. 26, 2012

Related U.S. Application Data

(63) Continuation of application No. PCT/EP2009/065517, filed on Nov. 20, 2009.

(30) Foreign Application Priority Data

Nov. 21, 2008 (EP) .................................... 08169676

(51) Int. Cl.
*C08L 83/04* (2006.01)
(52) U.S. Cl.
USPC ................................ 525/477; 528/17; 528/18
(58) Field of Classification Search
None
See application file for complete search history.

(56) References Cited

U.S. PATENT DOCUMENTS

| | | | |
|---|---|---|---|
| 3,960,802 A * | 6/1976 | Beers et al. | 524/857 |
| 4,962,152 A | 10/1990 | Leempoel | |
| 5,126,171 A | 6/1992 | Katsuno et al. | |
| 5,442,027 A | 8/1995 | Donatelli et al. | |
| 5,534,588 A * | 7/1996 | Knepper et al. | 524/730 |
| 6,172,150 B1 | 1/2001 | Kollmann et al. | |
| 2003/0051610 A1 | 3/2003 | Dux et al. | |
| 2006/0155045 A1 | 7/2006 | Tsuno et al. | |
| 2006/0217498 A1* | 9/2006 | Kameda et al. | 525/477 |
| 2007/0129528 A1 | 6/2007 | Huang et al. | |
| 2008/0251200 A1 | 10/2008 | Kimura et al. | |
| 2009/0004493 A1 | 1/2009 | Maier et al. | |
| 2009/0134551 A1* | 5/2009 | Delehanty | 264/299 |

FOREIGN PATENT DOCUMENTS

| | | |
|---|---|---|
| EP | 0409079 A2 | 1/1991 |
| EP | 0690099 A1 | 1/1996 |
| EP | 0787766 A1 | 8/1997 |
| GB | 2032936 A | 5/1980 |
| WO | WO 2006/125995 * | 11/2006 |
| WO | WO 2007/096355 A1 | 8/2007 |

OTHER PUBLICATIONS

International Search Report (PCT/ISA/210) issued on Feb. 19, 2010, by European Patent Office as the International Searching Authority for International Application No. PCT/EP2009/065517.
Written Opinion (PCT/ISA/237) issued on Feb. 19, 2010, by European Patent Office as the International Searching Authority for International Application No. PCT/EP2009/065517.
International Preliminary Report on Patentability and Written Opinion of the International Searching Authority dated May 31, 2011, issued in International Application No. PCT/EP2009/065517 (English translation).

* cited by examiner

*Primary Examiner* — Marc Zimmer
(74) *Attorney, Agent, or Firm* — Buchanan Ingersoll & Rooney PC

(57) ABSTRACT

A two-component silicone composition that includes a component A that includes i) at least one hydroxyl-group-terminated polydiorganosiloxane P; ii) at least one catalyst K for the cross-linking of polydiorganosiloxanes; and a component B that includes i') at least one cross-linking agent for polydiorganosiloxanes. Compositions can be used as adhesives, sealants, coatings or as casting compounds and can be distinguished by a very long shelf life.

18 Claims, No Drawings

STORAGE-STABLE TWO-COMPONENT SILICONE ADHESIVES AND SEALANTS WITH EXTENDED MIXER OPEN TIME

RELATED APPLICATIONS

This application claims priority as a continuation application under 35 U.S.C. §120 to PCT/EP2009/065517, which was filed as an International Application on Nov. 20, 2009 designating the U.S., and which claims priority to European Application No. 08169676.7 filed in Europe on Nov. 21, 2008. The entire contents of these applications are hereby incorporated by reference in their entireties.

FIELD

This disclosure relates to the field of two-component silicone compositions.

BACKGROUND INFORMATION

Two-component silicone compositions have been known and are used as adhesives and sealants in different applications. Compared to compositions with silane-cross-linking organic polymers (carbon-based polymer skeleton), such as, for example, silane-terminated polyurethanes, silicone compositions have a considerably higher UV stability; they are thereby suitable for applications where the adhesion or sealing is exposed to at least partial solar radiation.

Two-component silicone compositions that cross-link at room temperature, also known as RTV-2 silicones (RTV-2: "room temperature vulcanizing, 2-part silicones"), are known.

For example, such a two-component silicone composition is described in EP 0 787 766 A1. So as not to impair the shelf life of the composition or to prevent premature, accidental curing, the main components, namely an α,ω-dihydroxy-polydiorganosiloxane and a catalyst for the cross-linking of polydiorganosiloxanes, are stored in two separate components. In the application of such a composition, the two components are then mixed together, whereupon the cross-linking or the curing of the composition results.

Such two-component silicone compositions described in EP 0 787 766 A1 can lead to the so-called mixer open time problem. The latter primarily arises when the two components are mixed together via a static mixer or the like. In this case, namely during the meeting of the two components upon entry into the static mixer, the result can be a brief, local overconcentration of the catalyst-containing component relative to the polydiorganosiloxane-containing component, which can lead to quick curing of the composition inside the static mixer and can clog the latter. This occurs if the polydiorganosiloxane-containing component compared to the catalyst-containing component is used in a ratio by weight of ≥1:1, which is often the case in practice.

Possibilities for addressing the so-called mixer open time problem include, for example, the reduction of the catalyst concentration in the catalyst component, either by actual reduction of the catalyst content or else by higher dilution of the catalyst. The reduction of the catalyst content can result in an increase of the curing period, i.e., the pot life, which can be undesirable. It can entail higher dilution of the catalyst, such that additional diluents have to be used or non-reactive integral parts from the polydiorganosiloxane-containing component have to be shifted to the catalyst component, which can entail impairments in the workability and/or in the mechanics of the cured composition, and can limit the possibilities of the configuration of the composition.

The use of the catalyst in the polydiorganosiloxane-containing component has proved unsuitable to date for reasons of the shelf life of the silicone composition.

SUMMARY

A two-component silicone composition is disclosed, comprising:
a component A that comprises
i) at least one hydroxyl-group-terminated polydiorganosiloxane P;
ii) at least one catalyst K for the cross-linking of polydiorganosiloxanes; and
a component B that comprises
i') at least one cross-linking agent for polydiorganosiloxanes.

A method is disclosed for extending the mixer open time with a uniform pot life or a simultaneous shortening of the pot life of two-component silicone compositions, comprising containing a catalyst K for the cross-linking of polydiorganosiloxanes and at least one hydroxyl-group-terminated polydiorganosiloxane P, in the same component.

A two-component silicone composition is disclosed that can, for example, have an extended mixer open time while achieving a uniform pot life or a simultaneous shortening of the pot life.

By the use of, for example, specific polydiorganosiloxanes together with the catalyst for the cross-linking of polydiorganosiloxanes in the same component, two-component silicone compositions that have a mixer open time that is just as long as the pot life of the composition and that have a good shelf life, can be made available.

DETAILED DESCRIPTION

A two-component silicone composition is disclosed including a component A that comprises
i) at least one hydroxyl-group-terminated polydiorganosiloxane P;
ii) at least one catalyst K for the cross-linking of polydiorganosiloxanes; and a component B that comprises
i') at least one cross-linking agent for polydiorganosiloxanes.

Substance names that begin with "poly," such as, for example, polyol, include substances that formally contain two or more functional groups, occurring in their name, per molecule.

The term "polymer" comprises, on the one hand, a collection of macromolecules that are chemically uniform but different relative to the degree of polymerization, molecular weight, and chain length. The collection can be produced by a polyreaction (polymerization, polyaddition, or polycondensation). The term also comprises derivatives of such a collection of macromolecules from polyreactions. The derivatives can include compounds that are obtained by reactions, such as, for example, additions or substitutions, of functional groups on specified macromolecules, and that can be chemically uniform or chemically non-uniform. In addition, the term also comprises so-called prepolymers, for example, reactive oligomeric prepolymers whose functional groups are involved in the creation of macromolecules.

The term "mixer open time" is defined as the open time, i.e., the working life, of a reactive composition within a mixer. During this time, the material can remain in the mixer without being significantly changed in its processing properties and without rinsing or product-extrusion being necessary for continuing the working process.

The term "pot life" is defined as the working life of reactive compositions after their application. The end of the pot life can be connected with such an increase in viscosity of the composition that suitable workability of the composition is no longer possible.

The component A of the two-component silicone composition can comprise the hydroxyl-group-terminated polydiorganosiloxane P, which can be, for example, a polydiorganosiloxane P' of Formula (I).

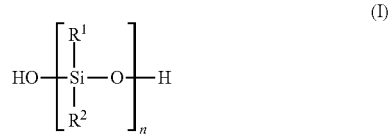

In this case, the radicals $R^1$ and $R^2$, independently of one another, stand for linear or branched, monovalent hydrocarbon radicals with 1 to 12 C atoms, which optionally have one or more heteroatoms and optionally one or more C—C multiple bonds and/or optionally cycloaliphatic and/or aromatic portions. For example, the radicals $R^1$ and $R^2$ can stand for alkyl radicals with 1 to 5 C atoms, for example, 1 to 3 C atoms, for example, methyl groups.

The variable n can be selected in such a way that the weight mean of the molecular weight $M_w$ of the polydiorganosiloxane P relative to polystyrene is 500 to 250,000 g/mol.

For example, the hydroxyl-group-terminated polydiorganosiloxane P' can be a polydiorganosiloxane P1 of Formula (I), wherein n is selected in such a way that the weight mean of the molecular weight $M_w$ of the polydiorganosiloxane P1 relative to polystyrene is 30,000 to 80,000 g/mol, for example, 40,000 to 60,000 g/mol, or in such a way that a mixture of:

i") at least one hydroxyl-group-terminated polydiorganosiloxane P2 of Formula (I), wherein n is selected in such a way that the weight mean of the molecular weight $M_w$ of the polydiorganosiloxane P2 relative to polystyrene is >80,000 to 250,000 g/mol, for example, 90,000 to 150,000 g/mol; and ii") at least one hydroxyl-group-terminated polydiorganosiloxane P3 of Formula (I), wherein n is selected in such a way that the weight mean of the molecular weight $M_w$ of the polydiorganosiloxane P3 relative to polystyrene is 500 to 80,000 g/mol, for example, 500 to 60,000 g/mol, for example, 1,000 to 30,000 g/mol, is used as polydiorganosiloxane P'.

Hydroxyl-group-terminated polydiorganosiloxanes, as they are shown, for example, in Formula (I), are commercially available. Also, the production of such polydiorganosiloxanes can be carried out in a known way. For example, exemplary production is described in U.S. Pat. No. 4,962,152, the entire contents of which are incorporated by reference herein.

The previously-described hydroxyl-group-terminated polydiorganosiloxanes P can have a viscosity of 1 to 500,000 mPa·s, for example, 10 to 250,000 mPa·s, at 23° C.

The polydiorganosiloxane P1 can have a viscosity of 5,000 to 20,000 mPa·s, for example, 5,000 to 10,000 mPa·s, at 23° C.

Polydiorganosiloxane P' is a mixture of at least one hydroxyl-group-terminated polydiorganosiloxane P2 and at least one hydroxyl-group-terminated polydiorganosiloxane P3. The polydiorganosiloxane P2 can have a viscosity of 10,000 to 500,000 mPa·s, for example, 15,000 to 250,000 mPa·s, at 23° C. The polydiorganosiloxane P3 can have a viscosity of 1 to 6,000 mPa·s, for example, 10 and 1,000 mPa·s, for example, between 20 to 500 mPa·s, at 23° C.

The indicated viscosities are measured according to DIN 53018.

Polydiorganosiloxanes P3 with a molecular weight $M_w$ below the indicated range can, for example, result in a disadvantageous increase of the pot life. On the other hand, polydiorganosiloxanes P3 with a molecular weight $M_w$ above the indicated range can, for example, result in an increase in the viscosity after storage, for example, in a deterioration of the shelf life.

The same can hold true for the indicated viscosity ranges.

For example, the hydroxyl-group-terminated polydiorganosiloxane P3 can have a numerical mean of the molecular weight $M_n$ of >1,000 g/mol in addition to the indicated ranges of the weight mean of the molecular weight $M_w$.

If a mixture of at least one polydiorganosiloxane P2 and at least one polydiorganosiloxane P3 is used as a polydiorganosiloxane P', the proportion by weight of polydiorganosiloxane P2 can be above the proportion by weight of polydiorganosiloxane P3. The respective proportions can be based on the molecular weight of the respective polydiorganosiloxanes.

For illustration, a non-limiting example is described. If, for example, a polydiorganosiloxane with a molecular weight $M_w$ in the range of 100,000 g/mol is used as a polydiorganosiloxane P2, and a polydiorganosiloxane with a molecular weight $M_w$ in the range of 5,000 g/mol is used as a polydiorganosiloxane P3, it can be sufficient to use P3 in an amount of approximately 0.5 to 5% by weight relative to P2 to achieve the desired effect. If, for example, a polydiorganosiloxane with a molecular weight $M_w$ in the range of 50,000 g/mol is used with the same P2 as polydiorganosiloxane P3, then it can be desirable for P3 to be used in an amount of approximately 20 to 40% by weight relative to P2 to achieve the desired effect.

The component A of the two-component silicone composition can comprise at least one catalyst K for the cross-linking of polydiorganosiloxanes. For example, catalyst K can be an organotin compound or a titanate.

Exemplary organotin compounds include dialkyltin compounds, for example, selected from dimethyltindi-2-ethylhexanoate, dimethyltin dilaurate, di-n-butyltin diacetate, di-n-butyltin di-2-ethylhexanoate, di-n-butyltin dicaprylate, di-n-butyltin di-2,2-dimethyloctanoate, di-n-butyltin dilaurate, di-n-butyltin distearate, di-n-butyltin dimaleinate, di-n-butyltin dioleate, di-n-butyltin diacetate, di-n-octyltin di-2-ethylhexanoate, di-n-octyltin di-2,2-dimethyloctanoate, di-n-octyltin dimaleinate and di-n-octyltin dilaurate.

As titanates or organotitanates, compounds that have at least one ligand bonded via an oxygen atom to the titanium atom can be used. As ligands bonded to the titanium atom via an oxygen-titanium bond, for example, alkoxy group, sulfonate group, carboxylate group, dialkylphosphate group, dialkylpyrophosphate group and acetylacetonate group can be used. Exemplary titanates include, for example, tetrabutyl titanate or tetraisopropyl titanate.

Suitable titanates can have at least one polydentate ligand, also called a chelate ligand. For example, the polydentate ligand can be a bidentate ligand.

Suitable titanates that can be used are commercially available from the Dupont Company, USA, for example, under the trade names Tyzor® AA, GBA, GBO, AA-75, AA-65, AA-105, DC, BEAT, and IBAY.

In an exemplary embodiment, mixtures of various catalysts can be used.

The proportion of the catalyst K for the cross-linking of polydiorganosiloxanes can be 0.001 to 10% by weight, for example, 0.005 to 4% by weight, for example, 0.01 to 3% by weight, of the entire two-component silicone composition.

The component B of the two-component silicone composition can comprise at least one cross-linking agent for polydiorganosiloxanes. For example, the cross-linking agent can be a silane of Formula (II).

$$(R^3)_{p}\!-\!Si\!-\!(OR^4)_{4-p} \tag{II}$$

In this case, the radical $R^3$, independently of one another, stands for a linear or branched, monovalent hydrocarbon radical with 1 to 12 C atoms, which optionally has one or more heteroatoms and optionally one or more C—C multiple bonds and/or optionally cycloaliphatic and/or aromatic portions.

The radical $R^4$, independently of one another, stands for a hydrogen atom, or for an alkyl radical with 1 to 12 C atoms, or for an oxime radical with 1 to 12 C atoms, or for an acyl radical with 1 to 12 C atoms. For example, the radical $R^4$ stands for an alkyl radical with 1 to 5 C atoms, for example, 1 to 3 C atoms, for example, a methyl group or an ethyl group.

The variable p stands for a value of 0 to 4, for example, provided that if p stands for a value of 3 or 4, at least p−2 radicals $R^3$ in each case have at least one group, for example, a hydroxyl group, that can be condensed and is reactive with the hydroxyl groups of the polydiorganosiloxane P. For example, p stands for a value of 0, 1 or 2, for example, a value of 0.

For the selection of the silane of Formula (II) as a cross-linking agent for polydiorganosiloxanes, for example, different requirements or preferences of the two-component silicone composition can be deciding factors. On the one hand, the reactivity of the silane can play a significant role, wherein basically higher-reactive silanes can be employed. For example, a vinyl group relative to a methyl group or a methyl group relative to an ethyl group can be employed as radical $R^3$. For example, toxicological reasons for the selection of the cross-linking agent can be deciding factors. For example, tetraethoxysilane can be employed as a cross-linking agent relative to tetramethoxysilane.

Examples of suitable silanes of Formula (II) are methyltrimethoxysilane, chloromethyltrimethoxysilane, ethyltrimethoxysilane, propyltrimethoxysilane, vinyltrimethoxysilane, methyltriethoxysilane, vinyltriethoxysilane, phenyltriethoxysilane, methyltripropoxysilane, phenyltripropoxysilane, tetramethoxysilane, tetraethoxysilane, tetra-n-propoxysilane or tetra-n-butoxysilane.

For example, silane of Formula (II) can be vinyltrimethoxysilane or tetraethoxysilane or their mixture.

For example, silanes can also already be present partially (for example, some of $R^4$=H) or completely (for example, all of $R^4$=H) hydrolyzed. Because of the greatly increased reactivity of partially or completely hydrolyzed silanes, their use as cross-linking agents can be advantageous. When using partially or completely hydrolyzed silanes for forming oligomeric siloxanes, for example, dimers and/or trimers, which are formed by condensation of hydrolyzed silanes, can result.

Accordingly, oligomeric siloxanes can also be used as cross-linking agents for the two-component silicone composition.

For example, exemplary oligomeric siloxanes include hexamethoxydisiloxane, hexaethoxydisiloxane, hexa-n-propoxydisiloxane, hexa-n-butoxydisiloxane, octaethoxytrisiloxane, octa-n-butoxytrisiloxane, and decaethoxytetrasiloxane.

Any mixture of the previously-mentioned silanes can be used as a cross-linking agent for the two-component silicone composition.

The proportion of the cross-linking agent for polydiorganosiloxanes can be 0.1 to 15% by weight, for example, 1 to 10% by weight, for example, 2 to 5% by weight, of the entire two-component silicone composition.

The two-component silicone composition can optionally contain at least one integral part.

Such at least one integral part can be selected from, for example, softeners, inorganic and/or organic fillers, hardening accelerators, pigments, adhesion promoters, processing adjuvants, rheology modifiers, stabilizers, dyes, inhibitors, heat stabilizers, antistatic agents, flame retardant agents, pesticides, waxes, flow enhancers, thixotropic agents, and other standard raw materials and additives that are known to one skilled in the art.

When using such optional integral parts, integral parts that can impair the shelf life of the composition by reaction with one another or with other contents, can be stored separately from one another.

The integral part, optionally present in the two-component silicone composition, can be selected in such a way that the shelf life of the two components of the two-component silicone composition is not negatively influenced by the presence of such an integral part, for example, that the composition does not change or changes only slightly in its properties, for example, the application and curing properties, in storage. This means, for example, that reactions resulting in the chemical curing of the described two-component silicone composition do not occur to a significant extent during storage. In an exemplary embodiment, the above-mentioned integral parts contain no water or at most traces of water or release it during storage. Certain integral parts can be dried, for example, chemically or physically before mixing into the composition.

As softeners, for example, trialkylsilyl-terminated polydialkylsiloxanes, for example, trimethylsilyl-terminated polydimethylsiloxanes, can be used. Trimethylsilyl-terminated polydimethylsiloxanes with viscosities of 1 to 10,000 mPa·s can be employed. Viscosities of 10 to 1,000 mPa·s can be employed. Trimethylsilyl-terminated polydimethylsiloxanes can also be used, in which some of the methyl groups are replaced by other organic groups, such as, for example, phenyl, vinyl or trifluoropropyl. Although linear trimethylsilyl-terminated polydimethylsiloxanes can be used as softeners, those compounds that are branched can also be used. Such branched compounds can be produced in that in the starting substances used in their production, small amounts of tri- or tetrafunctional silanes are used. Instead of polysiloxane softeners, it is also possible to use other organic compounds, such as, for example, certain hydrocarbons or mixtures thereof, as softeners. Such hydrocarbons can be aromatic or aliphatic. For example, these hydrocarbons can have a low volatility and a sufficient compatibility with the other integral parts of the silicone composition.

The proportion of the softener can be 2 to 15% by weight, for example, 5 to 10% by weight, of the entire two-component silicone composition.

The composition can include, for example, at least one filler. The filler can influence the rheological properties of the non-cured composition and the mechanical properties and the surface composition of the cured composition. Both active and passive fillers in the two-component silicone composition can be used. In the case of active fillers, chemical or physical interactions with the polymer occur; in the case of passive fillers, the latter do not occur or occur only to a lesser extent.

Exemplary fillers include inorganic and organic fillers, for example natural, ground or precipitated calcium carbonates, which optionally are coated with fatty acids, for example, stearic acid, calcinated kaolins, aluminum oxides, aluminum hydroxides, silicic acids, for example, highly dispersed silicic acids from pyrolysis processes, carbon black, for example, industrially produced carbon black ("carbon black"), aluminum silicates, magnesium-aluminum silicates, zirconium silicates, quartz flour, christobalite flour, diatomaceous earth, mica, iron oxides, titanium oxides, zirconium oxides, gypsum, annaline, barium sulfate ($BaSO_4$, also referred to as barite or heavy spar), boron carbide, boron nitride, graphite, carbon fibers, glass fibers or hollow glass spheres, whose surface optionally is treated with a hydrophobizing agent. Exemplary fillers can be selected from calcium carbonates, calcined kaolins, carbon black, highly dispersed silicic acids as well as flame-retardant fillers, such as hydroxides or hydrates, for example, hydroxides or hydrates of aluminum, for example, aluminum hydroxide.

In an exemplary embodiment, the silicone composition can contain highly dispersed silicic acids from pyrolysis processes or calcium carbonates as fillers.

In an exemplary embodiment, a mixture of various fillers can be used.

An exemplary amount of filler lies, for example, in the range of 10 to 70% by weight, for example, 15 to 60% by weight, for example, 30 to 60% by weight, relative to the entire two-component silicone composition.

Alkoxysilanes that can be substituted with functional groups can be used as adhesion promoters. The functional group can be, for example, an aminopropyl, glycidoxypropyl or mercaptopropyl group. Amino-functional groups can be employed. The alkoxy groups of such silanes can be methoxy or ethoxy groups. Aminopropyltrimethoxysilane, 3-aminopropyltriethoxysilane, 3-(2-aminoethyl)-aminopropyltriethoxysilane and 3-mercaptopropyltriethoxysilane can be employed. It is also possible to use a mixture of adhesion promoters. In addition, for example, amino-functional alkylsilsesquioxanes such as amino-functional methylsilsesquioxane or amino-functional propylsilsesquioxane, alkoxylated alkylenamines, for example, ethoxylated and/or propoxylated alkylenediamines, as well as other, for example, substituted, oligomers, polymers or copolymers based on polyalkylene glycols can be employed as adhesion promoters.

When using silanes as adhesion promoters, the possibility exists that the latter can be present in a partially or completely hydrolyzed form depending on conditions, for example moisture. In addition, in the presence of such partially or completely hydrolyzed silanes by condensation reactions, the formation of oligomeric siloxanes, for example, dimers and/or trimers, can occur.

The proportion of the adhesion promoter can be 0.1 to 15% by weight, for example, 1 to 10% by weight, for example, 1 to 5% by weight, of the entire two-component silicone composition.

The optional integral parts can have one or more functions or actions ascribed to them. For example, a single integral part or a single compound can have several functions. For example, many adhesion promoters, also cross-linking agents or fillers, can simultaneously be rheology modifiers or the like.

The two-component silicone composition can be stored, for example, in a package that has two chambers that are separate from one another. In this connection, the component A can be present in one chamber, and the component B can be present in the other chamber of the package. Suitable packaging can include, for example, double cartridges, such as twin or coaxial cartridges, or multi-chamber tubular bags with adapters. The mixing of the two components A and B can be carried out using a static mixer, which can be put on the package with two chambers.

Suitable packages are described, for example, in US 2006/0155045 A1, WO 2007/096355 A1, and in US 2003/0051610 A1, the entire contents of which are incorporated by reference herein.

In an industrial-scale unit, the two components A and B can be stored separately from one another in drums or pails and can be pressed and mixed upon application, for example, by means of gear pumps. The composition can be applied to a substrate by hand or in an automated process by a robot.

For example, the two-component silicone composition can be used in such a way that the ratio by weight of the component A to the component B is 1:1, for example, from 3:1 to 15:1, for example, from 10:1 to 13:1.

An exemplary advantage of the use of the components A and B in the described exemplary ratio by weight is, for example, that existing units for delivery and application of two-component silicone compositions in this way are common, and conversion of the units to the application of components A and B in the ratio by weight of, for example, 1:1 on the user side was associated with high expense.

In an exemplary embodiment, the component B does not comprise any polymerizable polydiorganosiloxanes. For example, a better shelf life of component B can be attained.

Both component A and component B of the previously-described two-component silicone composition can be produced and stored, for example, with exclusion of moisture. The two components can have a long shelf life separately from one another, for example, they can be stored over a time period of several months up to one year and longer with the exclusion of moisture in a suitable package or arrangement, as they were described previously, without being changed in their application properties or in their properties after the curing to an extent relevant for their use. Shelf life can be determined by measuring viscosity or reactivity over time.

In the application of the two-component silicone composition, the components A and B can be mixed together, for example by stirring, kneading, rolling or the like, for example, with a static mixer. The hydroxyl groups of the hydroxyl-group-terminated polydiorganosiloxane P can come into contact with the hydrolyzable groups or optionally with already hydrolyzed groups of the cross-linking agent, by which it results in the curing of the composition by condensation reactions. The contact of the silicone composition with water, for example, in the form of atmospheric humidity, in the application, can also promote the cross-linking, since silanol groups are formed by the reaction of water with the hydrolyzable groups of the cross-linking agent; silanol groups whose reactivity relative to the hydroxyl groups of the polydiorganosiloxane P can be increased. The curing of the two-component silicone composition can be carried out, for example, at room temperature.

In the cross-linking of the two-component silicone composition, for example, compounds of Formula HO—$R^4$, wherein $R^4$ is as previously described, can be produced as reaction products of the condensation reaction. These side products of the condensation reaction can be compounds that impair neither the composition nor the substrate to which the composition is applied. The reaction product of Formula HO—$R^4$ can be a compound that is slightly volatilized from the composition that is cross-linking or is already cross-linked.

A cured silicone composition formed from a two-component silicone composition by mixing component A with component B, is disclosed.

The use of two-component silicone compositions, as they are previously described, as adhesive, sealant, as coating or as casting compound, is disclosed. The compositions can be used as an adhesive.

A two-component silicone composition can be used in a method for bonding two substrates S1 and S2 that comprise:
 a) application of a two-component silicone composition according to the preceding description on a substrate S1 and/or a substrate S2;
 b) ensuring contact of the substrates S1 and S2 via the applied composition within the open time of the composition;
 c) curing of the composition by reaction of components A and B; wherein the substrates S1 and S2 are the same or different from one another.

The compound can be used in a method for sealing or coating comprising
 a') application of a two-component silicone composition according to the preceding description on a substrate S1 and/or between two substrates S1 and S2;
 b') curing of the composition by reaction of components A and B; wherein the substrates S1 and S2 are the same or different from one another.

Directly before or during the application of the two-component composition, the two components A and B can be mixed together.

A two-component silicone composition can have a pasty consistency with structurally viscous properties. Such a composition can be applied with a suitable device to the substrate, for example, in the form of a bead. The bead can have an essentially round or triangular cross-sectional surface area.

A composition can have, for example, good application properties, high stability and little stringiness. This can mean that after application, it remains in the applied form; for example, it does not diffuse, and there is little or no stringiness after the application device is turned off, so that the substrate is not fouled.

As substrates S1 and/or S2, for example, substrates can be used that are selected from concrete, mortar, brick, tile, ceramic, gypsum, natural stone, such as granite or marble, glass, glass ceramic, metal or a metal alloy such as aluminum, steel, nonferrous metal, galvanized metal, wood, plastic such as PVC, polycarbonate, polymethyl(meth)acrylate, polyester, epoxide resin, dyes and paints.

A two-component silicone composition can be used, for example, in industrial manufacturing, for example, of motor vehicles and objects of daily use, as well as in construction, for example, in structural engineering and civil engineering. The two-component silicone composition can be used in window installation.

An article is disclosed that includes an at least partially cured silicone composition according to the preceding description, wherein this article can be, for example, a structure, an industrial commodity, or a means of transportation, for example, a building, or a portion thereof.

For example, the article can include: houses, glass fronts, windows, baths, bathrooms, kitchens, roofs, bridges, tunnels, streets, automobiles, trucks, rail cars, buses, ships, mirrors, glass panes, tubs, linens, household appliances, dishwashers, washing machines, baking ovens, headlights, fog lamps or solar panels.

A method is disclosed for extending the mixer open time with uniform pot life or with simultaneous shortening of the pot life of two-component silicone compositions, wherein a catalyst K for the cross-linking of polydiorganosiloxanes in the component A is used together with at least one hydroxyl-group-terminated polydiorganosiloxane P.

For example, by a method with use of a hydroxyl-group-terminated polydiorganosiloxane P, as it is previously described, for example, upon entry of the two components A and B into a static mixer, a brief, local overconcentration of the catalyst relative to the polydiorganosiloxane can be prevented from occurring.

EXAMPLES

Indicated below are exemplary embodiments. The disclosure is not limited to these described exemplary embodiments.

Production of the Silicone Compositions

The following compositions were produced:

As components A and B, the integral parts presented in Tables 2 to 4 were mixed together and stirred in the indicated percentages by weight in a dissolver at room temperature under inert atmosphere until a macroscopically homogeneous paste was obtained.

The produced components A and B were filled into the separate chambers of double cartridges, and the cartridges were sealed. In the application, the components A and B were mixed by means of a static mixer.

Description of the Test Methods

The viscosity was determined according to DIN 53018.

The shelf life was determined based on the viscosity of the respective component A or the increase in viscosity of the component A of the two-component silicone compositions. In this case, a first measurement was carried out after the production of component A, and conditioning of the composition in the cartridge was carried out during one day at room temperature ("1 d at 23° C."); the second measurement was carried out after four days of storage of the cartridge at a temperature of 70° C. ("4 d at 70° C."); and the third measurement was carried out after seven days of storage of the cartridge at a temperature of 70° C. ("7 d at 70° C."). If the viscosity increases after seven days of storage at 70° C. by less than 25% relative to the starting value ("1 d at 23° C."), a shelf life of the component A under study of at least six months at room temperature can be expected, which can correspond to the requirements of such compositions. Compositions with a viscosity increase of 40% or more, for the purposes of this experiment, are considered to be unsuitable.

The pot life of the composition was measured by having the components A and B, packaged in advance in sealed cartridges for 24 hours at 23° C., be mixed together in a ratio by weight of 13:1 with a static mixer. Then, it was stirred with a wooden spatula at least once per minute in the composition, and the time was determined after which the composition no longer had long threads (pasty behavior) when the wooden spatula was pulled out quickly but rather broke after brief string formation (rubber-like behavior). This time is referred to as the end of the pot life. As in the viscosity measurement, the end of the pot life was measured after storage periods of "1 d at 23° C.," "4 d at 70° C.," and "7 d at 70° C."

The mixer open time was measured analogously to the pot life, but the components A and B were mixed together in a ratio by weight of 3:1 to simulate the local overconcentration of the catalyst-containing component relative to the polydiorganosiloxane-containing component. The measured time until the occurrence of the rubber-like behavior is referred to as the end of the mixer open time. In the measurement of the mixer open time, care was taken so that the catalyst was used in an amount such that in a mixing ratio A:B of 13:1, an overall catalyst proportion, identical in all examples, was produced in the entire two-component silicone composition. In the examples in Table 2, this overall catalyst proportion is approximately 0.028% by weight.

The tensile strength and the elongation at break were measured according to DIN 53504 on films with a layer thickness of 2 mm, which were stored for 7 days at 23° C., 50% relative air humidity, with a measuring speed of 200 mm/minute on a Zwick/Roell Z005 drawing machine. The indicated values are the mean values of five measurements.

The Shore A hardness was determined according to DIN 53505.

As in the measurement of viscosity, the tensile strength, the elongation at break, and the Shore A hardness were measured in each case after storage periods of the two-component silicone compositions at "1 d at 23° C.," "4 d at 70° C.," and "7 d at 70° C."

By means of gel-permeation chromatography (GPC relative to polystyrene; column: PLgel mixed bed, 2×, (0.8×30 cm); eluant: THF; flow: 1 ml/minute; temperature: 35° C.; approximately 100 mg of the sample dissolved in 10 ml of THF and filtered by a 0.45 μm PTFE membrane filter), the molecular weights $M_w$ and $M_n$ of the hydroxyl-group-terminated polydimethylsiloxanes were determined. In Table 1, the viscosities as well as the mean values of $M_w$ and $M_n$ are indicated.

TABLE 1

Viscosities as well as Weight Mean ($M_w$) and Numerical Mean ($M_n$) of the Molecular Weight of the Hydroxyl-Group-Terminated Polydimethylsiloxanes (OH-Term. PDMS) used in these Examples

|  | Viscosity [mPa·s] | $M_w$ [g/mol] | $M_n$ [g/mol] |
|---|---|---|---|
| OH-term. PDMS | 20,000[a] | 100,000 | 45,000 |
|  | 6,000[a] | 55,000 | 28,000 |
|  | 630-880[b] | 26,210 | 12,830 |
|  | 80[b] | 5,700 | 2950 |
|  | 35-45[b] | 1790 | 1020 |
|  | 16-32[b] | 830 | 550 |

[a] Available from Wacker Chemie AG, Germany
[b] Available from Wacker Chemie AG, Germany

TABLE 2

Two-Component Silicone Compositions 1 to 4 and Results of the Mixture of A:B in the Ratio of 13:1

|  |  |  | 1 | 2 | 3 | 4 |
|---|---|---|---|---|---|---|
| A | OH-Term. PDMS[a] ($M_w$ = 100,000 g/mol) |  | 28.4 | 40.17 | 38.95 | 40.57 |
|  | OH-Term. PDMS[a] ($M_w$ = 55,000 g/mol) |  | 12.17 |  |  |  |
|  | OH-Term. PDMS[a] ($M_w$ = 5,700 g/mol) |  |  | 0.4 | 1.62 |  |
|  | Softener |  | 7.7 | 7.7 | 7.7 | 7.7 |
|  | Adhesion Promoter |  | 1 | 1 | 1 | 1 |
|  | Chalk |  | 50.7 | 50.7 | 50.7 | 50.7 |
|  | Catalyst[c] |  | 0.03 | 0.03 | 0.03 | 0.03 |
| B | Vinyl Term. PDMS[b] |  | 20.2 | 20.2 | 20.2 | 20.2 |
|  | Tetraethoxysilane |  | 32.3 | 32.3 | 32.3 | 32.3 |
|  | Silicic Acid |  | 17.2 | 17.2 | 17.2 | 17.2 |
|  | Carbon Black |  | 20.2 | 20.2 | 20.2 | 20.2 |
|  | Adhesion Promoter |  | 10.1 | 10.1 | 10.1 | 10.1 |
| Total Proportion [% by Weight] of the Catalyst in A:B = 13:1 |  |  | 0.028 | 0.028 | 0.028 | 0.028 |
| Viscosity [Pa·s] | 1 d at 23° C. |  | 1069 | 1163 | 660 | 1140 |
|  | 4 d at 70° C. |  | 1146 | 1234 | 700 | 1343 |
|  | 7 d at 70° C. |  | 1207 | 1425 | 800 | 1673 |
| Viscosity Increase in % |  |  | 12% | 22% | 21% | 47% |
| End of Pot Life [Minutes] | 1 d at 23° C. |  | 10 | 5 | 9 | 7 |
|  | 4 d at 70° C. |  | 6 | 5 | 8 | 4 |
|  | 7 d at 70° C. |  | 5 | 5 | 8 | 3 |
| Elongation at Break [%] | 1 d at 23° C. |  | 164 | 167 | 152 | 168 |
|  | 4 d at 70° C. |  | 166 | 175 | 167 | 205 |
|  | 7 d at 70° C. |  | 145 | 162 | 193 | 210 |
| Tensile Strength [MPa] | 1 d at 23° C. |  | 2.2 | 2.2 | 2.2 | 1.8 |
|  | 4 d at 70° C. |  | 2.2 | 2.1 | 2.1 | 2.1 |
|  | 7 d at 70° C. |  | 2.1 | 1.9 | 2.2 | 2.4 |
| Shore A | 1 d at 23° C. |  | 40 | 44 | 44 | 41 |
|  | 4 d at 70° C. |  | 40 | 43 | 45 | 40 |
|  | 7 d at 70° C. |  | 41 | 40 | 41 | 35 |

Two-Component Silicone Compositions 5 to 9 and Results of the Mixture of A:B in the Ratio of 13:1

|  |  | 5 | 6 | 7 | 8 | 9 |
|---|---|---|---|---|---|---|
| A | OH-Term. PDMS[a] ($M_w$ = 100,000 g/mol) | 42.87 | 39 | 39 | 39 | 39 |
|  | OH-Term. PDMS[a] ($M_w$ = 830 g/mol) |  | 3.87 |  |  |  |
|  | OH-Term. PDMS[a] ($M_w$ = 1790 g/mol) |  |  | 3.87 |  |  |
|  | OH-Term. PDMS[a] ($M_w$ = 26,210 g/mol) |  |  |  | 3.87 |  |

TABLE 2-continued

|   |   | | | | | |
|---|---|---|---|---|---|---|
| | OH-Term. PDMS$^a$ (M$_w$ = 55,000 g/mol) | | | | | 3.87 |
| | Softener | 7.3 | 7.3 | 7.3 | 7.3 | 7.3 |
| | Adhesion Promoter | 0.9 | 0.9 | 0.9 | 0.9 | 0.9 |
| | Chalk | 48.9 | 48.9 | 48.9 | 48.9 | 48.9 |
| | Catalyst$^c$ | 0.03 | 0.03 | 0.03 | 0.03 | 0.03 |
| B | Vinyl Term. PDMS$^b$ | 20.2 | 20.2 | 20.2 | 20.2 | 20.2 |
| | Tetraethoxysilane | 32.3 | 32.3 | 32.3 | 32.3 | 32.3 |
| | Silicic Acid | 17.2 | 17.2 | 17.2 | 17.2 | 17.2 |
| | Carbon Black | 20.2 | 20.2 | 20.2 | 20.2 | 20.2 |
| | Adhesion Promoter | 10.1 | 10.1 | 10.1 | 10.1 | 10.1 |
| Viscosity | 1 d at 23° C. | 890 | 619 | 431 | 644 | 722 |
| [Pa · s] | 7 d at 70° C. | 1247 | 414 | 502 | 696 | 967 |
| Viscosity Increase in % | | 40 | −33$^d$ | 17 | 8 | 34 |
| End of Pot Life [Minutes] | 1 d at 23° C. | 12 | >15 h$^e$ | 170 | 22 | 20 |

$^a$OH-Term. PDMS: OH-Group-Terminated Polydimethylsiloxane
$^b$Vinyl Term. PDMS: Vinyl-Group-Terminated Polydimethylsiloxane with a Viscosity According to DIN 53018 of 20,000 mPa · s
$^c$Organotin Compound
$^d$Viscosity decrease occurs, when the thermally-induced depolymerization proceeds faster than the polymerization
$^e$The end of the pot life was still not reached after 15 hours

TABLE 3

Two-Component Silicone Compositions and Results of the Measurement of the Mixer Open Time of a Mixture of A:B in the Ratio of 3:1

|   |   | 1 | 2 | 3 | 1' | 2' | 3' |
|---|---|---|---|---|---|---|---|
| A | OH-Term. PDMS$^a$ (M$_w$ = 100,000 g/mol) | 28.4 | 40.17 | 38.95 | 28.4 | 40.17 | 38.95 |
| | OH-Term. PDMS$^a$ (M$_w$ = 55,000 g/mol) | 12.17 | | | 12.17 | | |
| | OH-Term. PDMS$^a$ (M$_w$ = 5,700 g/mol) | | 0.4 | 1.62 | | 0.4 | 1.62 |
| | Softener | 7.7 | 7.7 | 7.7 | 7.7 | 7.7 | 7.7 |
| | Adhesion Promoter | 1 | 1 | 1 | 1 | 1 | 1 |
| | Chalk | 50.7 | 50.7 | 50.7 | 50.73 | 50.73 | 50.73 |
| | Catalyst$^{c,d}$ | 0.03 | 0.03 | 0.03 | 0 | 0 | 0 |
| B | Vinyl Term. PDMS$^b$ | 20.2 | 20.2 | 20.2 | 20.2 | 20.2 | 20.2 |
| | Tetraethoxysilane | 32.3 | 32.3 | 32.3 | 32.3 | 32.3 | 32.3 |
| | Silicic Acid | 17.2 | 17.2 | 17.2 | 17.2 | 17.2 | 17.2 |
| | Carbon Black | 20.2 | 20.2 | 20.2 | 19.81 | 19.81 | 19.81 |
| | Adhesion Promoter | 10.1 | 10.1 | 10.1 | 10.1 | 10.1 | 10.1 |
| | Catalyst$^{c,d}$ | 0 | 0 | 0 | 0.39 | 0.39 | 0.39 |
| | Total Proportion [% by Weight] of the Catalyst at A:B = 13:1 | 0.028 | 0.028 | 0.028 | 0.028 | 0.028 | 0.028 |
| | Total Proportion [% by Weight] of the Catalyst at A:B = 3:1 | 0.0225 | 0.0225 | 0.0225 | 0.1 | 0.1 | 0.1 |
| | End of Mixer Open Time [Minutes] | 12 | 10 | 13 | <1 | <1 | <1 |

$^a$OH-Term. PDMS: OH-Group-Terminated Polydimethylsiloxane
$^b$Vinyl Term. PDMS: Vinyl-Group-Terminated Polydimethylsiloxane with a Viscosity According to DIN 53018 of 20,000 mPa · s
$^c$Organotin Compound
$^d$The proportion of the catalyst is selected in each case in such a way that an identical overall proportion of the catalyst (0.028% by weight, cf. Table 1) in 1 to 3 and in 1' to 3' would result in a ratio A:B of 13:1

What is claimed is:

1. A two-component silicone composition, comprising:

a component A that comprises i) at least one hydroxyl-group-terminated polydiorganosiloxane P;

ii) at least one catalyst K for the cross-linking of polydiorganosiloxanes; and a component B that comprises i') at least one cross-linking agent for polydiorganosiloxanes, wherein the weight ratio of component A to component B is 3:1 to 15:1.

2. The two-component silicone composition according to claim 1, wherein the hydroxyl-group-terminated polydiorganosiloxane P is a polydiorganosiloxane P' of Formula (I):

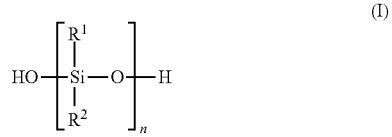

wherein, in the Formula (I),
each of radicals $R^1$ and $R^2$, independently of one another, represents a linear or branched, monovalent hydrocarbon radical comprising 1 to 12 C atoms, which optionally comprises one or more heteroatoms and optionally one or more C—C multiple bonds and/or optionally cycloaliphatic and/or aromatic portions; and
n is selected in such a way that a weight mean of the molecular weight $M_w$ of the polydiorganosiloxane P' relative to polystyrene is 500 to 250,000 g/mol.

3. The two-component silicone composition according to claim 2, wherein the hydroxyl-group-terminated polydiorganosiloxane P' is a polydiorganosiloxane P1 of Formula (I), wherein n is selected in such a way that the weight mean of the molecular weight $M_w$ of the polydiorganosiloxane P1 relative to polystyrene is 30,000 to 80,000 g/mol; or in such a way that a mixture of
   i") at least one hydroxyl-group-terminated polydiorganosiloxane P2 of Formula (I), wherein n is selected in such a way that the weight mean of the molecular weight $M_w$ of the polydiorganosiloxane P2 relative to polystyrene is >80,000 to 250,000 g/mol; and
   ii") at least one hydroxyl-group-terminated polydiorganosiloxane P3 of Formula (I), wherein n is selected in such a way that the weight mean of the molecular weight $M_w$ of the polydiorganosiloxane P3 relative to polystyrene is 500 to ≤80,000 g/mol, is used as polydiorganosiloxane P'.

4. The two-component silicone composition according to claim 3, wherein the radicals $R^1$ and $R^2$ represent alkyl radicals with 1 to 5 C atoms.

5. The two-component silicone composition according to claim 1, wherein the cross-linking agent for polydiorganosiloxanes is a silane of Formula (II):

(II)

wherein the radical $R^3$, independently of one another, represents a linear or branched, monovalent hydrocarbon radical with 1 to 12 C atoms, which optionally has one or more heteroatoms and optionally one or more C—C multiple bonds and/or optionally cycloaliphatic and/or aromatic portions;
the radical $R^4$, independently of one another, represents a hydrogen atom, or an alkyl radical with 1 to 12 C atoms, or an oxime radical with 1 to 12 C atoms, or an acyl radical with 1 to 12 C atoms; and
p represents a value of 0 to 4, provided that if p represents a value of 3 or 4, at least p–2 radicals $R^3$ in each case have at least one group that can be condensed and is reactive with the hydroxyl groups of the polydiorganosiloxane P.

6. The two-component silicone composition according to claim 5, wherein p represents a value of 0.

7. The two-component silicone composition according to claim 6, wherein the radical $R^4$ represents an alkyl radical with 1 to 5 C atoms.

8. The two-component silicone composition according to claim 1, wherein the component B does not contain any polymerizable polydiorganosiloxanes.

9. The two-component silicone composition according to claim 1, wherein the catalyst K is an organotin compound or a titanate.

10. The two-component silicone composition according to claim 1, further comprising at least one adhesion promoter.

11. A method of forming a cured silicone composition from the two-component silicone composition according to claim 1, comprising mixing component A with component B.

12. A method for extending the mixer open time with a uniform pot life or a simultaneous shortening of the pot life of a two-component silicone composition, comprising providing the two-component silicone composition of claim 1, and mixing component A with component B.

13. The two-component silicone composition according to claim 4, wherein the radicals $R^1$ and $R^2$ represent alkyl radicals with 1 to 3 C atoms.

14. The two-component silicone composition according to claim 4, wherein the radicals $R^1$ and $R^2$ represent methyl groups.

15. The two-component silicone composition according to claim 7, wherein the radical $R^4$ represents an alkyl radical with 1 to 3 C atoms.

16. The two-component silicone composition according to claim 7, wherein the radical $R^4$ represents a methyl group or an ethyl group.

17. The two-component silicone composition according to claim 1, wherein the weight ratio of component A to component B is 10:1 to 13:1.

18. The two-component silicone composition according to claim 10, wherein the at least one adhesion promoter comprises an organoalkoxysilane that has amino groups.

* * * * *